Dec. 2, 1924.　　　　　　　　　　　　　　　　1,517,441
H. O. LINDGREN
MEANS FOR PREVENTING REMIXING OF SEPARATED LIQUIDS
Filed July 20, 1923
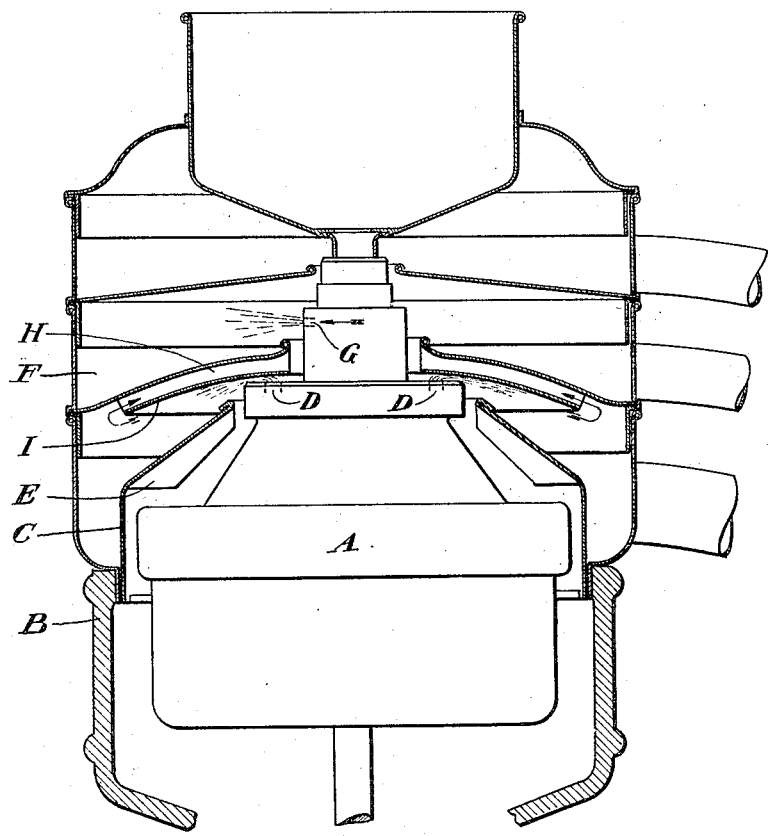
Inventor
H. O. Lindgren
By Marks & Clerk
Attys.

Patented Dec. 2, 1924.

1,517,441

UNITED STATES PATENT OFFICE.

HANS OLOF LINDGREN, OF STOCKHOLM, SWEDEN, ASSIGNOR, BY MESNE ASSIGNMENTS, TO THE DE LAVAL SEPARATOR COMPANY, OF NEW YORK, N. Y., A CORPORATION OF NEW JERSEY.

MEANS FOR PREVENTING REMIXING OF SEPARATED LIQUIDS.

Application filed July 20, 1923. Serial No. 652,812.

*To all whom it may concern:*

Be it known that I, HANS OLOF LINDGREN, a subject of the King of Sweden, residing at Fleminggatan 8, Stockholm, Sweden, have invented certain new and useful Improvement in Means for Preventing Remixing of Separated Liquids, of which the following is a specification.

In centrifuges for the separation of liquids it is common practice that the separated liquid or liquids are drawn off from the bowl of the centrifuge through openings which are free or provided with regulating means, said liquid or liquids being collected in vessels disposed about the bowl. Owing to the high speed of rotation of the centrifuge bowl the escaping liquids are then atomized by the friction in the air into a fine vapour which may be easily carried from one vessel to another by prevailing air currents. Thus the result of the centrifugal process may be disadvantageously influenced, which may cause great drawbacks, particularly in such cases where a liquid has to be purified from another in the highest possible degree, as for instance in the separation of skim-milk from cream.

The present invention has for its object to avoid such remixing of the liquids by producing powerful air currents issuing from the collecting vessel for collection of the liquid which is particularly liable to suffer by remixing, to the vessel for collection of the liquid from which the first-mentioned liquid is to be liberated as far as possible. Thus, for instance, where a milk separator is considered, it is a question of producing a powerful air current from the collecting vessel for the skim-milk to the collecting vessel for the cream. Where a separator is considered which is adapted to liberate oil from water, the air current should be consequently directed from the oil vessel to the water receptacle.

It is previously known from centrifuges to produce an air current from the casing surrounding the bowl to the center of the sheet-metal cover disposed on said casing by the arrangement of ridges on the side of the cover facing the bowl, such ridges preventing the air from taking part in the rotation of the bowl and thus obviating the ensuing of a centrifugal force (compare the Swedish Patent No. 27,300). This arrangement which is entirely satisfactory for its purpose, that is to say for preventing moisture and spattering water from penetrating down to the bowl, is not, however, suitable for the above-mentioned object. The fact is that if such ridges were disposed within a vessel receiving liquid from the bowl of the centrifuge, a powerful impact would be caused between the escaping liquid and the ridges, resulting partly in the liquid being still more atomized, and partly in the flow of air being disadvantageously influenced. Moreover, if ridges were disposed in some other place than in the space between the bowl and the vessel immediately joining the same, thus for instance on the lower side of the partition between the skim-milk cover and the cream cover, the available rotation of the air would be rather weak, for reasons easily understood, and the effect of the ridges would thus be rather trifling.

According to the present invention, an embodiment of which is diagrammatically shown in the accompanying drawing, these difficulties are overcome by the arrangement of an additional partition providing a close chamber in which the air current may form without being disturbed by escaping liquids. The partition also has for its purpose to prevent the atomization of the liquid which would take place in case of the liquid hitting the ridges provided directly.

The invention is distinguished by the fact that one or both of the bottoms separating the collecting vessel for the liquid, the entrance of which into another vessel is to be prevented, from adjacent parts of the centrifuge, is provided with a partition at or in the proximity of its central hole and on that side which is turned away from the inside of the collecting vessel, said partition being arranged at some distance from the bottom, so as to provide a space between the partition and the bottom, which space is protected from the liquid flowing out of the bowl of the centrifuge.

Between the said bottom and the partition there may be arranged ridges disposed radially, spirally, or in some other way.

In the drawing, A denotes the separator bowl rotating within the casing B. Placed above the bowl is the vessel C adapted to receive the skim-milk flowing out through the opening D. Between the bowl A and the vessel C there may be arranged ridges E in known manner, said ridges producing an upwardly directed air current through the central hole of the vessel C. Placed on top of the skim-milk vessel C is the cream vessel F, into which the cream flows through the opening G. To prevent the fine cream vapour from penetrating through the hole in the partition between the skim-milk vessel and the cream vessel into the former, there is arranged an additional partition I near the underside of the first-mentioned partition, a number of ridges H of suitable form being also provided between the main partition and the additional partition, if desired. Under the influence of the bowl neck protruding into the milk vessel and through the action of the issuing milk, the air within the milk vessel is caused to rotate in a certain degree, such rotation bringing about an increased pressure toward the parts of the apparatus situated farther off from the center. As the air between the bottom of the cream vessel and the partition is to a certain extent protected from taking part in the rotation and is, broadly speaking, entirely prevented therefrom, particularly in the case of ridges being provided, the centrifugal force of this quantity of air being thus smaller than in the freely rotating body of air, a powerful air current will be produced inwards toward the cream vessel. At any rate, this air current will prevent fine cream particles from spattering down to the skim-milk and from remixing therewith. The action will be altogether the same in the case of a centrifuge for the treatment of liquids other than milk.

What I claim as new and desire to secure by Letters Patent of the United States of America is:—

1. In a centrifugal machine for separating liquids of different specific gravities in combination, a bowl provided with openings for the passage of separated liquids, collecting vessels for the separated liquids disposed about said bowl, said vessels being separated by a partition, and a second partition secured in spaced relation to said first mentioned partition, the space between said partitions being in communication with the vessel in which said second partition lies, at points remote from and adjacent to the centre of said vessel.

2. In a centrifugal machine for separating liquids of different specific gravities, in combination, a bowl provided with openings for the passage of separated liquids, collecting vessels for the separated liquids disposed about said bowl, a partition between said vessels, a second partition supported by said first mentioned partition, the space between said partitions being in communication with the interior of the vessel in which said second partition lies at a point remote from the centre of said vessel and in communication with the other of said vessels at a point relatively near the periphery of said bowl.

3. In a centrifugal machine for separating liquids of different specific gravities, in combination, a bowl provided with openings for the passage of separated liquids, collecting vessels for the separated liquids disposed about said bowl, a partition between said vessels provided with a central aperture affording communication between said vessels, a second partition supported by and spaced from said first mentioned partition, the space between said partitions being in communication with the vessel in which said second partition lies at a point remote from the centre thereof and in communication with the central aperture in said first mentioned partition whereby due to the differential pressures at points remote from and adjacent to the centre of said vessel a current of air will be set up in said space and travel from one vessel to the other.

4. In a centrifugal machine for separating liquids of different specific gravities, in combination, a bowl provided with openings for the passage of separated liquids, collecting vessels for the separated liquids disposed about said bowl, a partition between said vessels, a second partition secured in spaced relation to said first mentioned partition, and a plurality of radially extending vanes between said partitions, the space between said partitions being in communication with the vessel in which said second partition lies at points remote from and adjacent the centre of said vessel.

5. In a centrifugal machine for separating liquids of different specific gravities, in combination, a bowl provided with openings for the passage of separated liquids, collecting vessels for the separated liquids disposed about said bowl, a partition between said vessels, a second partition secured in spaced relation to said first mentioned partition, and a plurality of radially extending spiral vanes between said partitions, the space between said partitions being in communication with the vessel in which said second partition lies at points remote from and adjacent the centre of said vessel.

In testimony whereof I affix my signature in presence of two witnesses.

HANS OLOF LINDGREN.

Witnesses:
J. H. NEUROTH,
H. L. KJELLBERG.